United States Patent [19]

Haendler et al.

[11] 4,008,336
[45] Feb. 15, 1977

[54] METHOD OF PREPARING AVOCADO-PEAR PULP POWDER CONTAINING CUCURBITA MOSCATO AS A STABILIZER AND PRODUCT

[75] Inventors: Lucien Haendler, Clichy; Georges Mangeot, Macon, both of France

[73] Assignee: Institut Francais de Recherches Fruitieres Outre-Mer (I.F.A.C.), Paris, France

[22] Filed: Mar. 10, 1975

[21] Appl. No.: 556,979

[30] Foreign Application Priority Data

Mar. 14, 1974 France .................... 74.08769

[52] U.S. Cl. .................... 426/270; 426/321; 426/615; 426/640
[51] Int. Cl.² .................... A23D 4/00
[58] Field of Search .......... 426/321, 331, 532, 615, 426/640, 72, 73, 262, 270, 465, 471, 473, 524

[56] References Cited

UNITED STATES PATENTS

| 592,906 | 11/1897 | Gere | 426/640 |
|---|---|---|---|
| 3,567,469 | 3/1971 | Pedroza et al. | 426/615 |
| 3,597,231 | 8/1971 | Kane | 426/640 |
| 3,865,955 | 2/1975 | Friedman | 426/331 |
| 3,958,036 | 5/1976 | Latimer | 426/640 |

OTHER PUBLICATIONS

Chemical Abstracts, 1972, vol. 77, Article 46971k, "Control of Fermentation in Vegetable Sauce."
Chemical Abstracts, 1956, vol. 50, Article 5942f, "Silage Formulas for Hog Feeding."
Chemical Abstracts, 1971, vol. 75, Article 18932p, "Technology of Fruit Preparations for Infants."

*Primary Examiner*—Norman Yudkoff
*Assistant Examiner*—Martin G. Mullen
*Attorney, Agent, or Firm*—Oblon, Fisher, Spivak, McClelland & Maier

[57] ABSTRACT

A method is disclosed for stabilizing fruit and vegetable products, particularly avocado-pear pulp, by incorporating therewith an effective amount of a cucubitaceous stabilizing agent, such as 1–25% by weight of cucurbita moscata, prior subjecting the mixture so obtained to a preservation procedure, for example by converting an homogeneous paste prepared by mixing said cucurbita moscata with said avocado-pear pulp to a powder.

8 Claims, No Drawings

METHOD OF PREPARING AVOCADO-PEAR PULP POWDER CONTAINING CUCURBITA MOSCATO AS A STABILIZER AND PRODUCT

The present invention relates to a new process for obtaining products comprising at least one member of the group consisting of fruits and vegetables suitable for storage.

The process consists in incorporating an effective amount of a cucurbitaceous stabilizing agent in fruit and/or vegetables before the preservation step and in then subjecting the mixture so obtained to the known preservation step.

The cucurbitaceous product used is, for example, the marrow.

This process is useful for obtaining preparations comprising avocado-pears suitable for preservation.

The present invention relates to a process for obtaining products comprising at least one member of the group consisting of fruits and vegetables, which are suitable for storage; it relates more specifically to a process for obtaining powdered extracts comprising at least one member of the group consisting of fruits and vegetables, which are suitable for storage i.e. which may be stored. A further object of the present invention is the products obtained by the said process and their applications.

This invention more particularly relates to a process for obtaining products comprising one member of the group consisting of fruits and vegetables suitable for storage, said process consisting in using a cucurbitaceous stabilizing agent.

At present, fruit and vegetable extracts in mashed or powdered form are used more and more frequently in foodstuff and cosmetic preparations. In addition to having the same vitamin content and organoleptic qualities as fresh fruits and vegetables, these extracts are required to have very great stability on storage. Use of these extracts enables certain problems to be solved, for example, problems obtaining supplies, availability, manpower, etc.

Processes for obtaining fruit or vegetable extracts are already known. There may be mentioned, for example, the various processes used for obtaining preparations comprising avocado-pears which are stable on storage; physical treatments are used in these processes, such as freezing, deep-freezing, freeze-drying, treatment with infra-red, ultraviolet or ionizing radiations, or chemical treatments alone or associated with physical treatments, such as treatment with a stabilizing chemical agent followed by treatment with ultraviolet or ionizing radiations.

However, there are considerable drawbacks to such processes, such as the use of expensive techniques such as deep-freezing, and the necessity in certain cases of distributing the said products, such as those containing avocado-pears, by "cold" industrial circuits.

The avocado-pear products so prepared cannot be used immediately, owing to the fact that, before using them, it is necessary to convert them into a usable form. Furthermore, the stability avocado-pears obtained by freezing or deep-freezing disappears as soon as the state of metastable balance obtained by cold conditions stops.

It is difficult to successfully rehydrate avocado-pear which has been freeze-dried after deep-freezing; furthermore, its stability is not very good in the anhydrous state.

Avocado-pears stabilized with chemical agents, and treated with ultraviolet or ionizing radiations or not, are not readily accepted by the health services of many countries, owing to the use of certain chemical stabilizing agents which are not approved by these services.

Thus, use of the above-mentioned preservation steps does not produce an avocado-pear product, which has the organoleptic qualities of fresh avocado-pears after a long period of storage.

Similar difficulties are also met with during the storage of other fruit or vegetable products in the form of their extracts.

On the other hand food products containing cucurbitacae and processes for obtaining thereof have already been disclosed.

French Pat. No. 7,141,188 relates to a biological food product as "potée" constituted with vegetables selected from the group consisting of beets, pumpkins, carrots, cabbages, endives, marrows, French beans and also the vegetables selected from the group consisting of celeries, onions, lecks and tomatoes, the vegetables of the first group being a fraction higher than the one of the second group.

According to the process disclosed in this French Patent the vegetables are peeled, cut into pieces and immediately freeze-dried.

This reference does not concern the use of cucurbitacae as preserving agents for fruits and/or vegetables; furthermore it must be pointed out that, according to the process of the above mentioned French Patent, a homogeneous mixture of vegetables is not prepared before the freeze-drying step.

The French Pat. No. 7,141,188 only discloses a combination of a number of vegetables, which keep their individuality during the preservation step owing to the fact that they are immediately freeze-dried after cutting.

German Pat. No. 837,645 discloses a process for obtaining edible products from plants or plant portions containing cellulose, hemicellose, pectin and proteins, the process consists of impregnating the crushed plants, preferably in presence of a reducing agent, with an edible acid and in continuing the hydrolysis at higher temperatures and optionally in drying and/or roasting.

The products so obtained may be used as filler products in the manufacture of marmalades, fruit juices and the like. The starting materials used in this process are especially pumpkins, cucumbers, salsifies sugar-beets or mangel-courzels.

The process disclosed in this German patent prepares, from products, which do not digest easily and which have a bad taste, products which digest more easily and have a good taste, said products allowing an improvement of the feeding. Thus this German patent only aims at reaping advantages from materials rich in food-value substances and not easily consumable as such; however it teaches no means for preserving foodstuff mixtures.

Dutch Pat. No. 4748 discloses a process for obtaining fruit compotes from gourds and apples the process consists in curing the gourd pulpe, passing it through a sieve for making a compote and mixing it within juice of raw acid apples, juice obtained by partially pressing cured acid apples and citris juice or pur wine-vinegar. This above Dutch process allows the manufacture of a substitute of apple-compote by using gourd treated according to the specific process disclosed hereinabove.

A new process has now been found which enables products comprising at least one member of the group consisting of fruits and vegetables, to be easily obtained, and more particularly powdered extracts thereof, which have excellent qualities on storage.

It is an object of this invention to provide a process for obtaining products comprising at least one member of the group consisting of fruits and vegetables, which have good qualities on storage.

Another object of this invention relates to products comprising at least one member of the group consisting of fruits and vegetables having good qualities on storage. Further features, objects and advantages will either be specifically pointed out or become apparent from the following detailed disclosure of the invention.

The process of the invention for obtaining products comprising at least one member of the group consisting of fruits and vegetables, stable on storage comprise the steps of 1. incorporating with at least one member of the group consisting of fruits and vegetables, prior to preservation step, an efficient amount of cucurbitaceous stabilizing agent and
2. subjecting the fruit-cucurbitaceous and/or vegetable-cucurbitaceous mixture to a known preservation step properly speaking.

Within the meaning of the present specification, the expression "cucurbitaceous stabilizing agent" designates any product obtained from a cucurbitaceae, especially a liquid or solid fraction thereof, such as that obtained from the pulp. Advantageously, a crushed product of *cucurbita moscata* known as "marrow" is used.

The preservation steps most frequently used to obtain fruit or vegetable products are treatment by a cold process, drying biochemical or biological stabilization, and the like.

Fruit which can be treated according to the present invention are, for example, avocado-pears, citrus fruits, or grains such as corn or soya beans.

According to a particular preferred embodiment of the invention, from 1 to 25% by weight of a cucurbitacae, such as marrow, is mixed with the pulped avocaodo-pear at a temperature in the range of 4° to 28° C, and preferably at ambient temperature, until a homogeneous paste is obtained, and the mixture so obtained is then converted into a powder, using any known drying method.

The amount of cucurbitaceous product to be used according to this invention depends on the fruit treated, it should be sufficient to inhibit reactions of degradation, notably of lipids, which normally occur, and should not change the organoleptic qualities of the final product.

Trials have shown that, when the fruit treated is the avocado-pear, amounts of cucurbitaceous products in the range of 1 to 25%, and preferably of 5 to 15% based on the amount of avocado-pear, is suitable.

The temperature at which the fruit, such as the avocado-pear, is mixed with the cucurbitaceous product used as the stabilizing agent, should be in the range of 4° to 28° C; carrying out this step at ambient temperature is much preferred.

According to a preferred embodiment of the invention, the avocado-pear-cucurbitaceous product mixture is then converted into a powder by any known method, such as, for example, by atomization, drying, freeze-drying, drying with microwaves, infra-red and ultraviolet radiations, ionizing radiations, or by rapid drying in a drum. It will be easy for one skilled in the art to determine the conditions necessary to obtain, from the avocado-pear-cucurbitaceous product mixture, a powdered product suitble for preserving by using any of the above-mentioned methods. In the case of drying by atomization, the step is advantageously effected at an attack temperature in the range of 140° to 250° C and a temperature of the outlet air in the range of 75 to 100° C.

According to one embodiment of this invention, it is further possible to use, as a stabilizing agent, a chemical agent already used for this purpose, such as ascorbic acid in combination with the cucurbitaceous product. Under these conditions, the amount of cucurbitaceous product to be used depends on the amount of the chemical agent used; it is, however, preferable to use the maximum amount of the cucurbitaceous stabilizing agent; it falls to the one skilled in the art to determine the relative amounts to be used.

As new products, the invention also relates to products comprising at least one member of the group consisting of fruits and vegetables, said products being stable on storage and contain an effective amount, for storage, of a cucurbitaceous stabilizing agent.

According to a particularly advantageous characteristic, the product is an avocado-pear composition.

The cucurbitaceous stabilizing agent preferably consists of crushed *cucurbita moscata*, commonly known as marrow.

The present invention especially allows the obtaining of powdered extracts of fruits or vegetables, and notably powdered extracts of avocado-pears, wherein the vitamin levels and organoleptic qualities of the fresh product are preserved. The incorporation of cucurbitaceous products in fruit according to the invention also enables frozen or deep-frozen products to be obtained which are stable on storage, and whose properties are not changed by the thawing step.

The addition of cucurbitaceous products according to the invention permits the degradation reactions to be blocked, and notably degradative oxidation of the lipids contained in the product; it inhibits the processes which cause the product to become bitter, as well as changes in pigmentary characteristics.

It should be noted that the products obtained according to the invention are notably useful as preserving agents for food preparations or products, the latter, in that case containing an effective amount of a product of the invention as a preserving agent.

The invention will be illustrated in greater detail by the following non-limitating example.

EXAMPLE

A solution containing 40 liters water, 15 g ascorbic acid and 3 kilos of marrow pulp was prepared. To this solution there was then added 70 kg of "Fuerte" avocado-pear pulp (corresponding to about 100 kg of ripe, unpulped avocado-pears) and 7 kg of peeled marrow; said mixture was then introduced into a colloidal crushed and ground until a homogenous paste was obtained; said paste was then put in a homogenizer and treated until a fine, unctuous paste was obtained.

The paste was dried directly in an atomizer, the attack temperature being about 200° C, and the temperature of the air at the outlet was about 80° C; the powdered product is then collected by a cyclone system.

A very fine, pale green powder of light (not compact) consistency was obtained. Said powder could be easily rehydrated to obtain a product in mashed form, the latter having the organoleptic characteristics of the fresh avocado-pear used, the proper flavour of the marrow was not perceptible.

The powder prepared as in this exmaple was kept in a small bag closed in a non-inert atmosphere and away from light and moisture for a period of 6 months without any perceptible changes in its characteristics being observed.

What is claimed:

1. In a method of preparing a dry powder from avocado-pear pulp the improvement which comprises mixing from 1 to 25% by weight of cucurbita moscata with said avocado-pear pulp to form a homogeneous paste and then converting said paste to a dry powder.

2. The method of claim 1, wherein the temperature during the mixing of said avocado-pear pulp and said cucurbita moscata is from 4° to 28° C.

3. The method of claim 2, wherein the temperature during mixing is ambient temperature.

4. The method of claim 1, wherein said paste is converted into a dry powder by atomization.

5. The method of claim 4, wherein the atomization is conducted at an attack temperature of from 75° to 100° C.

6. The method of claim 1, wherein the amount of cucurbita moscata mixed with said avocado-pear pulp is from 5 to 15% by weight.

7. The dry, powdered avocado-pear composition prepared by the process which comprises mixing from 1 to 25% by weight of cucurbita moscata with avocado-pear pulp to form a homogeneous paste followed by converting said paste to a dry powder.

8. The dry powdered avocado-pear composition of claim 7, wherein from 5 to 15% by weight of said cucurbita moscata is mixed with said avocado-pear pulp.

* * * * *